United States Patent [19]

Snuttjer et al.

[11] Patent Number: 5,147,015
[45] Date of Patent: Sep. 15, 1992

[54] SEAL OIL TEMPERATURE CONTROL METHOD AND APPARATUS

[75] Inventors: Owen R. Snuttjer, Oviedo; Michael J. Rasinski, Winter Springs, both of Fla.

[73] Assignee: Westinghouse Electric Corp., Pittsburgh, Pa.

[21] Appl. No.: 646,925

[22] Filed: Jan. 28, 1991

[51] Int. Cl.$^5$ .............................. F01M 5/00
[52] U.S. Cl. .................. 184/6.22; 184/6.4; 184/104.1; 277/22; 415/112
[58] Field of Search .............. 277/15, 22, 27, 75, 277/173, 174; 184/6.11, 104.1, 104.3, 6.1, 6.22, 6.4; 415/110, 111, 112, 180, 177, 175

[56] References Cited

U.S. PATENT DOCUMENTS

| 2,608,380 | 8/1952 | Rice | 415/111 |
|---|---|---|---|
| 2,664,173 | 12/1953 | Karig | 184/104.1 |
| 3,976,165 | 8/1976 | Pilarczyk | 184/6.22 |
| 4,193,603 | 3/1980 | Sood | 415/112 |
| 4,390,082 | 6/1983 | Swearingen | 184/6.4 |
| 4,486,024 | 12/1984 | Cooper | 277/174 |
| 4,495,035 | 1/1985 | Swearingen | 415/112 |
| 4,503,679 | 3/1985 | Saito et al. | 184/6.22 |

FOREIGN PATENT DOCUMENTS

| 0531064 | 10/1954 | Belgium | 277/75 |
|---|---|---|---|
| 3115149 | 11/1982 | Fed. Rep. of Germany | 184/104.1 |
| 3618794 | 12/1987 | Fed. Rep. of Germany | 184/104.3 |
| 0139036 | 12/1978 | Japan | 184/6.4 |
| 0090498 | 6/1982 | Japan | 184/6.11 |
| 0144617 | 8/1983 | Japan | 184/6.22 |
| 0138209 | 7/1985 | Japan | 184/6.11 |
| 0309702 | 12/1988 | Japan | 184/6.11 |

OTHER PUBLICATIONS

Turbine Generator Instruction Book . . . "Inter-cooled Turbine Generator for Houston Power & Lighting Company", Dec. 26, 1984, pp. 1–6.

Primary Examiner—Ira S. Lazarus
Assistant Examiner—Alan B. Cariaso
Attorney, Agent, or Firm—M. G. Panian

[57] ABSTRACT

A system for providing seal oils to a gland seal that surrounds the shaft of a generator with the temperature differences between the oils minimized. The temperature of one of the seal oils is utilized as a reference for controlling the oil temperature of the other seal oil. In particular, the temperature of the air-side seal oil is determined and utilized as a reference. The temperature of the hydrogen-side seal oil is determined, and a differentiator produces a signal based upon the difference between the air-side and hydrogen-side seal oils to control either the water flow rate to the hydrogen-side cooler, or to control mixing of cooled and uncooled oil in the hydrogen-side of the system. The system advantageously prevents thermal differential expansion from occurring in the generator shaft, and allows for the elimination of a controlled cooler in the air-side oil system. Further, the air-side oil can be suplied from the main lube oil system.

20 Claims, 4 Drawing Sheets

SEAL OIL TEMPERATURE CONTROL METHOD AND APPARATUS

TECHNICAL FIELD

The invention relates to turbine generators, and more specifically to gland seals for preventing or minimizing both the escape of hydrogen gas from a generator and the ingress of moisture and air into the generator. In particular, the present invention relates to a system for controlling temperatures of seal oils supplied to generator gland seals to reduce or minimize temperature differences between the oils that can create thermal differential expansion in the generator shaft.

BACKGROUND OF THE INVENTION

A typical generator arrangement will include a shaft which transmits torque from a turbine to rotate a rotor in the generator to generate electricity. The rotor shaft also extends from the other side of the generator (often referred to as the exciter side) for support by a bearing. Generally, within the generator, an environment is provided which includes a gas such as hydrogen or helium for better heat conduction and reduced windage losses. On the shaft side which transmits the torque (turbine side) as well as the shaft side which provides support (exciter side), seals are provided for preventing escape of the gas, and also for preventing ingress of moisture or air to the interior of the generator. The seals may be in the form of a gland seal which directs two flows of oil toward and along the shaft. One flow of oil (hereinafter the hydrogen-side seal oil) will flow along the shaft toward the generator to prevent the escape of hydrogen to the outside atmosphere. Another flow (air-side seal oil) flows outwardly toward the bearing to prevent access of air or moisture into the generator. Since the oils tend to absorb hydrogen, air and moisture, the oil feed systems are separate, thereby preventing release of hydrogen to the outside atmosphere, and maintaining a high hydrogen purity within the generator. For best operation, the temperatures of the air-side seal oil and hydrogen-side seal oil should be maintained at or near the same temperature, and should be kept within 4° F. If the oils are not at or near the same temperature, the seal ring can become distorted or non-uniformly thermally altered, thereby producing vibrations as the shaft rotates. Ring distortions can produce a rubbing between the shaft and the ring of the seal, which can in turn generate localized heating of the shaft causing it to bend and producing vibrations. Thus, it is essential to maintain the air-side seal oil and hydrogen-side seal oil at or near the same temperature.

Currently, two methods are available for temperature control of the hydrogen- and air-side oils. In one method, separate manual controls of cooling water to a cooler for the hydrogen-side oil, and a cooler for the air-side oil are utilized to control the respective oil temperatures. However, manual control requires constant adjustment to maintain the same or approximately the same temperatures of the two oils. Constant adjustment is necessary due to the continued variations in the flow rates and temperatures of the seal oil, as well as flow rates and temperatures of the cooling water supplied for controlling the temperatures. Thus, constant attention of an operator is required.

In a second method, individual automatic temperature controllers are provided for each cooler, with the temperature controllers set at the same temperature. The use of two controllers also requires adjustments to ensure that the temperatures are similar, since as the cooling water temperature varies, the desired flow response to a particular temperature deviation will also vary. In addition inherent system deviations make it difficult to maintain a small temperature differential. A major problem and expense involved with the use of separate controls is due to the requirement that the temperature control is finely tuned such that each system accurately responds to the set temperature, with the two controllers having a combined tolerance which ensures the required minimal temperature differential.

Thus, a system for providing seal oils to a gland seal ring is needed which can accurately and economically control the temperatures to reduce or minimize temperature differentials between the oils. Preferably, such a system should eliminate the need for constant adjustment as is the case with manual control or separate individual controllers. In addition, it is desirable to reduce the cost associated with precise and accurate independent control of the two flows.

SUMMARY OF THE INVENTION

In accordance with the present invention, a system for supplying seal oil to the hydrogen-side and air-side of a gland seal is provided which can reduce or minimize the temperature difference between the seal oils. The system utilizes the temperature of one of the seal oils as a reference, and controls the temperature of the other seal oil in response. Since one of the oils is utilized as a reference, a separate accurate control of the reference oil is not necessary as variation in the reference oil temperature is accommodated by a corresponding adjustment by the temperature control of the other seal oil. Thus, the need for constant adjustment, and the need for extremely accurate and precise controllers for two separate systems is not necessary.

It is therefore an object of the present invention to provide a seal oil feeding system which can provide seal oils to a seal such as a gland seal, with the oils fed at or near the same temperature.

It is a further object of the present invention to provide a temperature control system for providing seal oils having minimal temperature differences, in which continual adjustment of the temperature controls is not necessary.

It is another object of the present invention to provide a temperature control for seal oils for providing seal oils having small temperature differences, in which precise and accurate temperature controls for each seal oil are not necessary.

It is yet another object of the present invention to provide a system for feeding seal oils having little or no temperature differences, in which the temperature of one of the seal oils is utilized as a reference for controlling the temperature controls of a second seal oil.

These and other objects and advantages of the present invention will be apparent from the following detailed description when read in conjunction with the drawings.

DETAILED DESCRIPTION OF THE PREFERRED EMBODIMENTS

Figure 1:
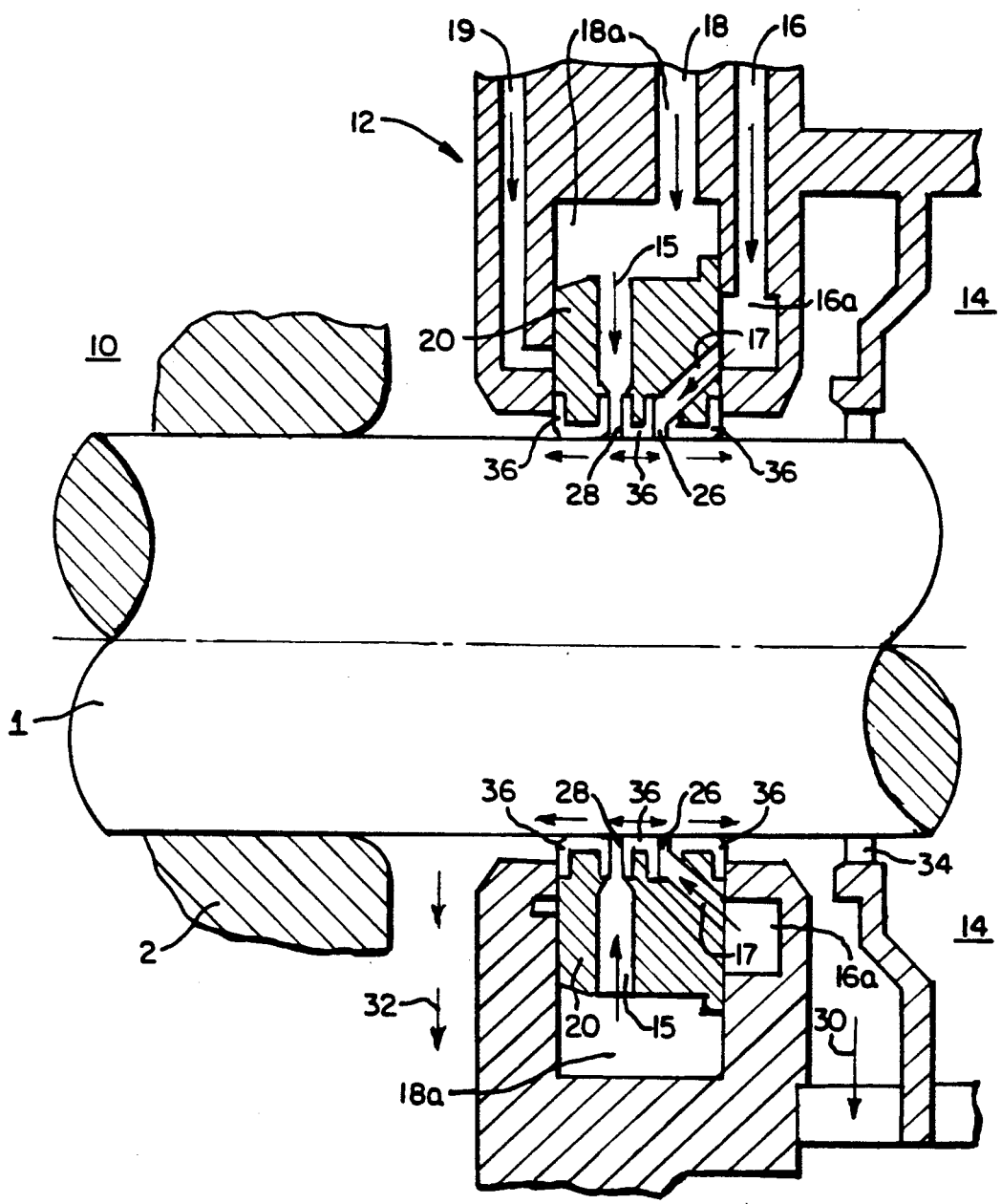
FIG. 1 is a sectional view of a gland seal and bearing structure to which the present invention pertains.

FIG. 1 illustrates a cross sectional view of the seal and bearing structure provided on larger generators (i.e., those in which the internal gas pressure of the hydrogen or other gas is in the range of 30-75 psi). The generator shaft 1 will either transmit torque from a turbine to the generator rotor on the turbine side, or will support the rotor on the exciter side opposite that of the turbine. A bearing 2 is provided for supporting the shaft, with the areas 10 outside of the bearing exposed to ambient air. The gland seal arrangement is shown generally at 12, and is in the form of an annular ring which directs fluid toward and along the shaft to form a seal between the air and moisture of the external atmosphere (10) and the internal atmosphere of hydrogen gas 14. A bearing and a gland seal are provided on both the exciter and turbine sides of the hydrogen generator, to support the shaft and to seal the hydrogen atmosphere within the generator. The gland seal does not support the shaft weight, but does support its own weight on the shaft.

Basically two flows of seal oils are provided to respective inlets 16,18 of the gland seal. The flow through inlet 16 adjacent the generator or hydrogen-side will be referred to as the hydrogen-side seal oil, while the flow to inlet 18 will be referred to as the air-side seal oil. The gland seal includes channels 16a, 18a for directing the respective seal oils to a gland seal ring 20, which in turn directs the oils toward the shaft via channels 15,17 formed in the annular gland seal ring. The channels 15,17 feed the oil to annular grooves which extend about the shaft to supply oil to the shaft.

The seal oils are directed toward the shaft causing the oils to flow along the shaft as indicated by the arrows shown on the shaft 1. The hydrogen-side oil is prevented from entering into the generator by a labyrinth seal ring 34, which typically takes the form of a brass ring having a radial clearance of approximately 0.010-0.020 inches. After flowing along the shaft, the hydrogen-side oil is directed to a drain as indicated by flow 30. The air-side oil is directed toward the bearing 2, and is drained as shown at 32. U-shaped babbitts 36 are provided, which are formed of a lead, tin or other soft material, such that if contact should occur between the shaft and the gland seal, the wear on the shaft will not be as great. The babbitt thus presents a softer surface than the gland seal ring 20, (which typically is bronze) and has a higher hardness and melting point than the material of the babbitt. The hydrogen-side oil thus flows through channels 16a, 17 and groove 26, toward and along the shaft, and is drained as shown at 30. The hydrogen-side oil blocks hydrogen from escaping from the interior of the generator. The hydrogen- and air-side oils are fed at substantially equal pressures to prevent mixing of the oils. Thus, air or moisture absorbed by the air-side oil is maintained away from the generator interior, and hydrogen absorbed by the hydrogen-side oil is maintained away from the external atmosphere.

The air-side seal oil is directed toward and along the shaft, is drained at 32, and prevents access of moisture and air into the interior of the generator. Float oil is also directed to a channel 19 which serves to apply pressure to the gland seal ring 20 for aiding in reducing any resultant, side forces on the gland seal ring. The flow to channel 19 may be of a pressure which is greater than that of the oils at 16,18, but generally it is sufficient to utilize an oil pressure which is the same as that of the oils 16,18 and typically the oil supplied at 19 will be from the same source as that of the air-side seal oil fed to the seal at 18. The float oil serves to compensate for the gas pressure of the generator interior which applies an axial outward force on the gland seal ring.

As mentioned earlier, it is extremely important to minimize the temperature differences between the hydrogen-side seal oil and the air-side seal oil. The temperature differences should be, at most, 4° F. If the temperature differences are not minimized, the non-uniform thermal expansion of the gland seal ring can cause vibrations and damage the generator shaft. For example, if the hydrogen-side oil is hotter than the air-side, gland seal ring portions adjacent the hydrogen-side will be enlarged relative to the air-side, which can result in vibrations due to rubbing of the gland seal ring (or more particularly, the babbitt associated with the ring), which in turn causes localized heating and bending of the shaft.

Figure 2:
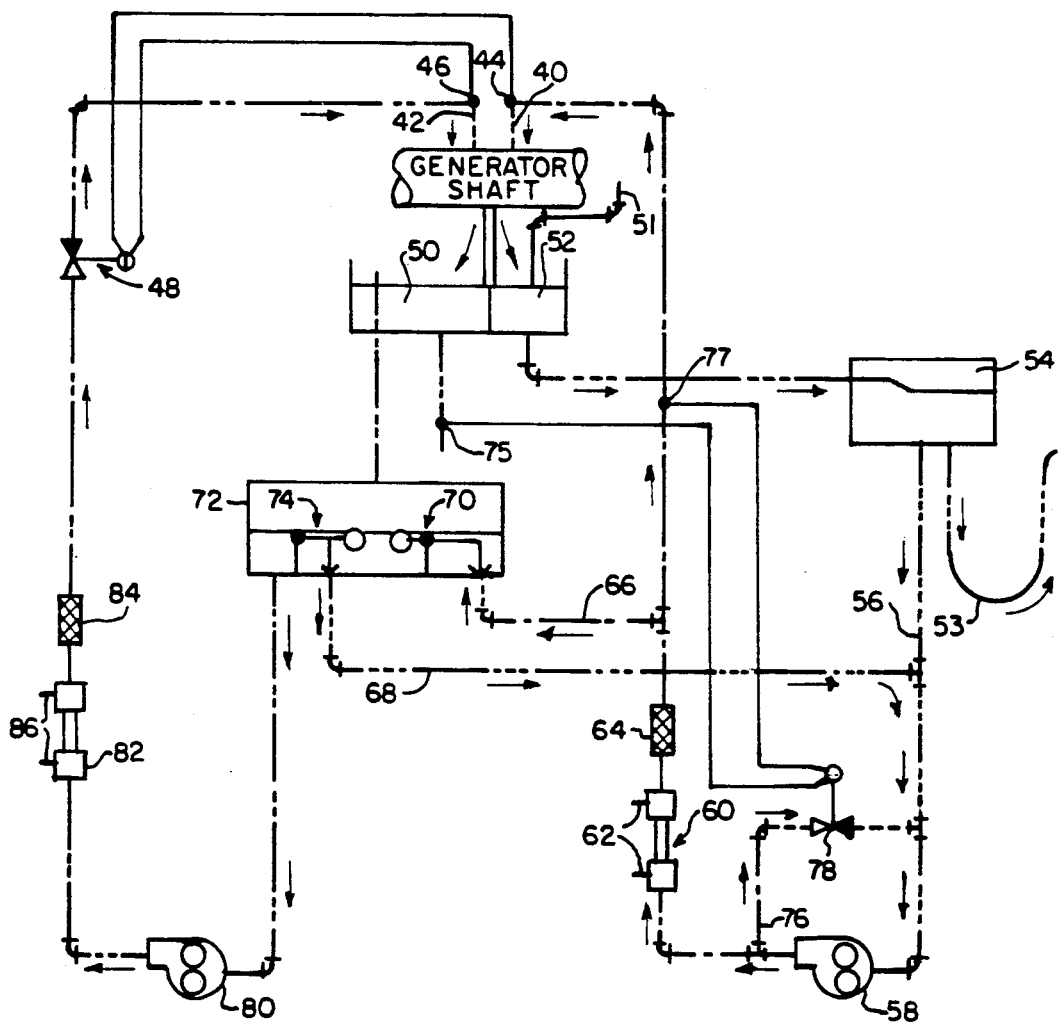
FIG. 2 is a schematic of conventional hydrogen-side and air-side oil flow systems.

FIG. 2 illustrates a feed system for the hydrogen- and air-side seals in accordance with the existing method or system. As shown in FIG. 2, a seal on the generator shaft will include an air-side seal oil directed toward the generator shaft as shown at 40, and a hydrogen-side seal oil feed as shown at 42. A pair of pressure sensors 44,46 are provided for operation of a pressure equalizing valve 48, such that the pressure of the air-side and hydrogen-side seal oils are the same. After passing over the generator shaft, the hydrogen-side oil drains from the gland seal (30, FIG. 1) to a defoaming tank 50. The defoaming tank slows the oil velocity and provides a large oil surface area which allows hydrogen bubbles to escape from the oil.

The air-side seal flows (32) oil from the gland seal to a common drain 52 with the bearing lubrication oil return as shown at 51. The bearing oil and air-side seal oil are returned to a loop seal tank 54 where oil vapors (and possible traces of hydrogen) are drawn off by a loop seal vapor extractor. The loop seal tank provides an interface with the main lubrication system of the generator, receiving oil from the air-side of the gland seal and from the bearings (via drain 52), with oil returning to the lubrication system as shown at 53. Loop seal tank 54 provides a source of oil for the air-side seal oil 58 via line 56. Thus, in the conventional system, the loop seal tank receives the hot air-side and bearing oil, allows excess to return (53) to the main lube oil system, and passes hot oil through pump 58 for cooling by the cooler 60.

The air-side oil from loop seal tank 54 is then pumped through a cooler 60 which includes water inlet and outlet ports 62 for supplying cooling water for controlling the temperature of the oil. After passing through a filter 64, the oil proceeds to the generator shaft as shown at 40.

Additional lines 66,68 are provided for maintaining an appropriate supply of oil in the hydrogen-side oil system. In particular, a float valve device 70 is provided in a regulating tank 72 which opens when the level of oil is low to receive oil from the flow line 66. An additional float valve 74 is provided which opens when the level is high to release oil through the line 68 to the suction side of the air-side seal oil pump. A bypass line 76 is provided with a bypass regulator 78 for maintaining the pressure of the air-side seal oil, such that it is maintained sufficiently above the hydrogen gas pressure in the generator during normal operation and typically the oil pressure will be maintained at 12 psi above the hydrogen gas pressure. To achieve the desired pressure differential, a sensor 75 senses gas pressure in the headspace of the defoaming tank, and sensor 77 senses pressure of the air-side oil, with the valve 78 controlled to maintain the oil pressure 12 psi above the gas pressure.

The hydrogen system feeds oil from the regulator tank 72 to a pump 80 which supplies pressurized oil for feeding through the cooler 82 and filter 84, and then through equalizing valve 48 for feed to the generator shaft as shown at 42. A pump bypass regulator (not shown) may also be provided to allow part of the pump not needed by the pressure equalizing valves to return to the suction side of the pump. The hydrogen-side cooler includes flow passages 86 for feeding of water, with the water feed rate controlled to control the cooling of the oil. In the prior art system, a manual control of the cooling water to the hydrogen and air-side coolers can be utilized for adjusting the temperatures in the air-side and hydrogen-side seal oil systems. However, it is often difficult to control the temperatures to minimize the temperature differences utilizing manual control, and constant operator attention is necessary.

Alternatively, individual temperature controllers have been provided which are set at the same temperature. However, with the individual controllers, deviations in the accuracy of the individual systems can cause the temperatures to deviate from the set temperature. More significantly, even where the temperature controllers are accurate, the systems will fluctuate due to varying flow rates and water coolant temperatures, with the oil and hydrogen seal oil temperatures deviating from the set temperature until the controller is able to adjust the coolant flow rates in an attempt to bring the oil temperatures to the set temperature. In addition, existing systems require separate coolers for controlling temperatures to be similar and below a maximum temperature (typically 120° F. maximum).

In accordance with the present invention, separate finely tuned controllers and/or coolers are not necessary for both the hydrogen-side and the air-side oil systems. Constant manual control of individual systems can also be eliminated. Most significantly, the temperature differences can be consistently minimized as compared to the prior art systems, even though the control is simplified from a hardware and operational perspective.

Figure 3A:
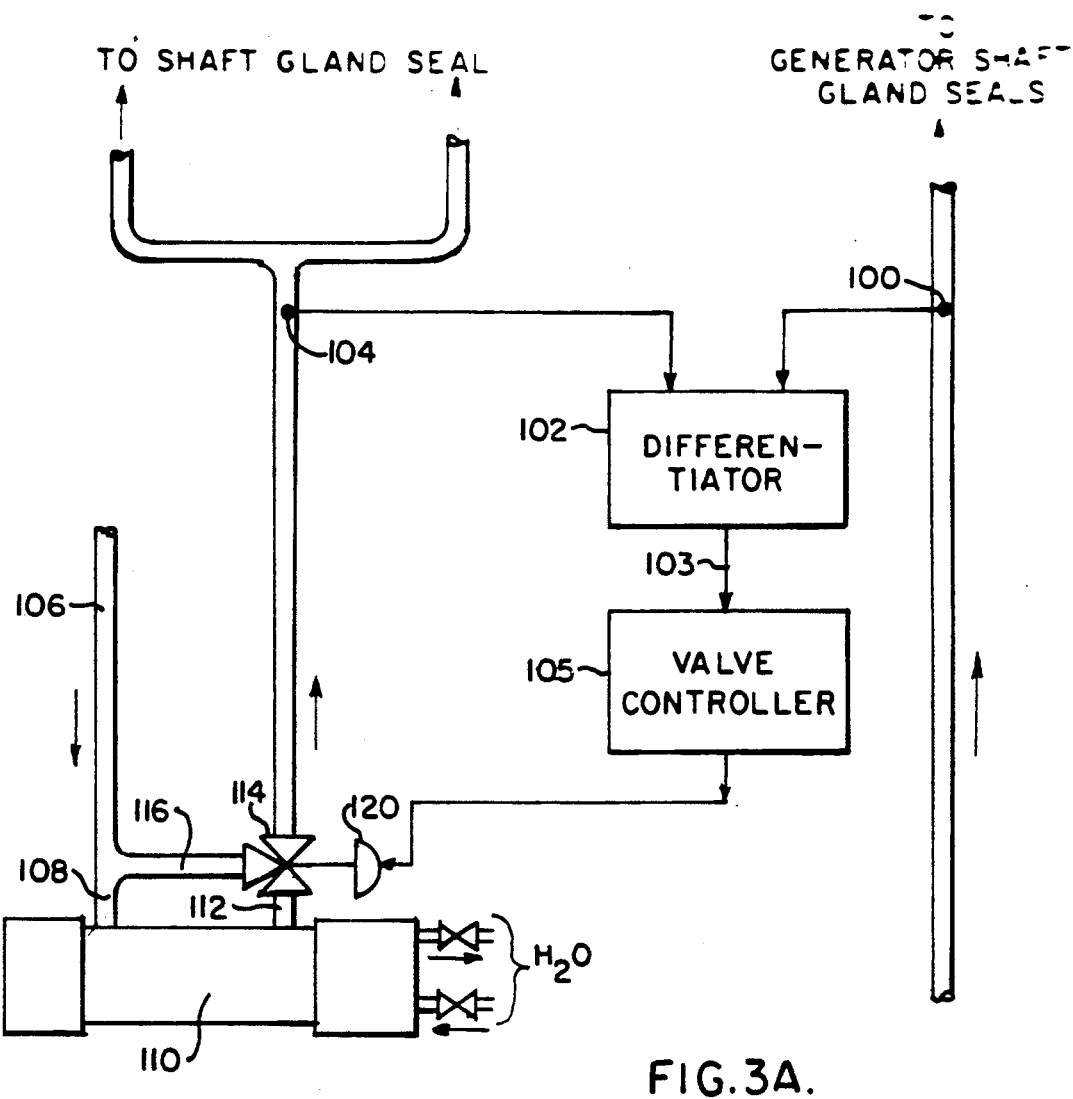
FIG. 3A is a schematic of the air-side and hydrogen-side oil temperature control system in accordance with the present invention.
Figure 3B:
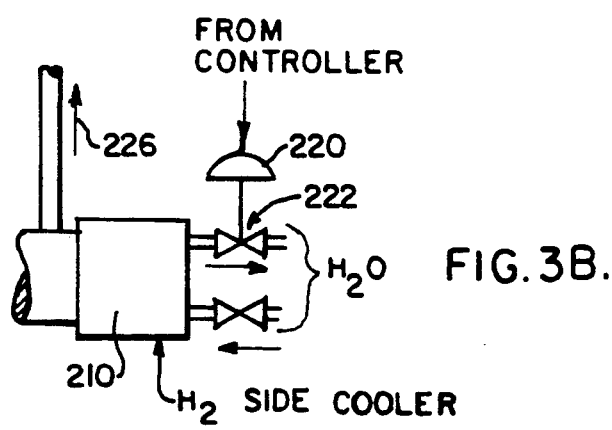
FIG. 3B shows a modification of the temperature control system of FIG. 3A.

FIGS. 3A and 3B illustrate the present invention in which separate control of the air-side and hydrogen-side oils is not utilized, but rather a differential temperature control system is utilized for controlling the hydrogen-side oil temperature, utilizing the air-side oil temperature as a reference. In particular, a sensor 100 is provided which senses the temperature of the air-side oil being fed to the gland seal and sends a signal indicative of the temperature to a differentiator 102. A temperature sensor 104 is also provided which provides the differentiator 102 with a signal indicative of the temperature of the hydrogen-side seal oil being fed to the gland seals. The differentiator 102 then provides a signal as shown at 103 to a valve controller 105 which then controls cooling of the hydrogen-side oil.

The hydrogen-side oil flows from a pump along passage 106 and is fed into the cooler at 108 and is cooled by the cooler 110, and is then fed out of the cooler at 112 through a three-way valve 114 and toward the gland seals. A bypass line 116 is provided which provides for mixing of cooled and uncooled oil to control the oil temperature fed to the gland seals. The three-way valve 114 controls the proportion of the mixing. The valve controller 105 thus provides a signal to a control or actuator 120 for the valve 114 to vary the mixing to adjust the hydrogen-side oil temperature to the reference temperature of the air-side oil. Thus, where the temperature of the hydrogen-side oil is sensed to be greater than that of the air-side oil, the three-way valve 114 reduces or eliminates the flow through 116, such that an increased proportion of the flow through the valve 114 is from the cooler outlet 112. Where the temperature is lower than that of the reference temperature, the valve 114 is controlled to increase the flow from the bypass 116.

Since the temperature control system utilizes the air-side oil as a reference, separate accurate controlling of the air-side oil is not necessary. In accordance with another aspect of the present invention, Applicants have recognized that, since separate control of the air-side oil is not necessary, a separate cooler for the air-side oil is not necessary, and the air-side system can simply utilize oil from the lube system which has been cooled in the main system. Most significantly, the temperature difference is more consistently minimized, since the system is not as subject to the fluctuations of two independently controlled systems.

In addition to these advantages, in the FIG. 3A system a more immediate and predictable response can be provided by the mixing of cooled and uncooled oil, since it is the mixing of oil which is provided for controlling the temperature, in contrast to the prior art system which controls the feed rate of the cooling water to the cooler. Often the cooling water temperature varies widely, and it is therefore difficult to predict the effect of a change in the water flow rate on the cooling of the oil. With the FIG. 3A system, the flow rate through the cooler can be maintained substantially constant. Another advantage of the FIG. 3A system resides in the ability to maintain a high water flow rate through the cooler, such that the formation of deposits within the cooler is reduced, thereby prolonging the life and efficient operation of the cooler.

An alternative embodiment of the control is shown in FIG. 3B. In the FIG. 3B arrangement, the bypass 116 and three-way valve are eliminated, and the temperature is controlled by controlling the flow rate of water through the cooler. While the FIG. 3B system does not provide the advantages associated with the oil mixing mentioned above, it is still advantageous over the prior art systems in eliminating the temperature controls and coolers for the air-side seal oil, and in providing a more consistent minimized temperature difference between the hydrogen-side and air-side seal oils. In the FIG. 3B arrangement, a control or actuator 220 receives a signal from a valve controller (similar to that shown at 105 in FIG. 3A), which, in response to a temperature difference signal from a differentiator (102), controls operation of the outlet valve 222 of the cooler 210, thereby controlling the flow rate of water through the cooler, and thus controlling the temperature of the hydrogen-side oil passing from the cooler as shown at 226.

Figure 4:
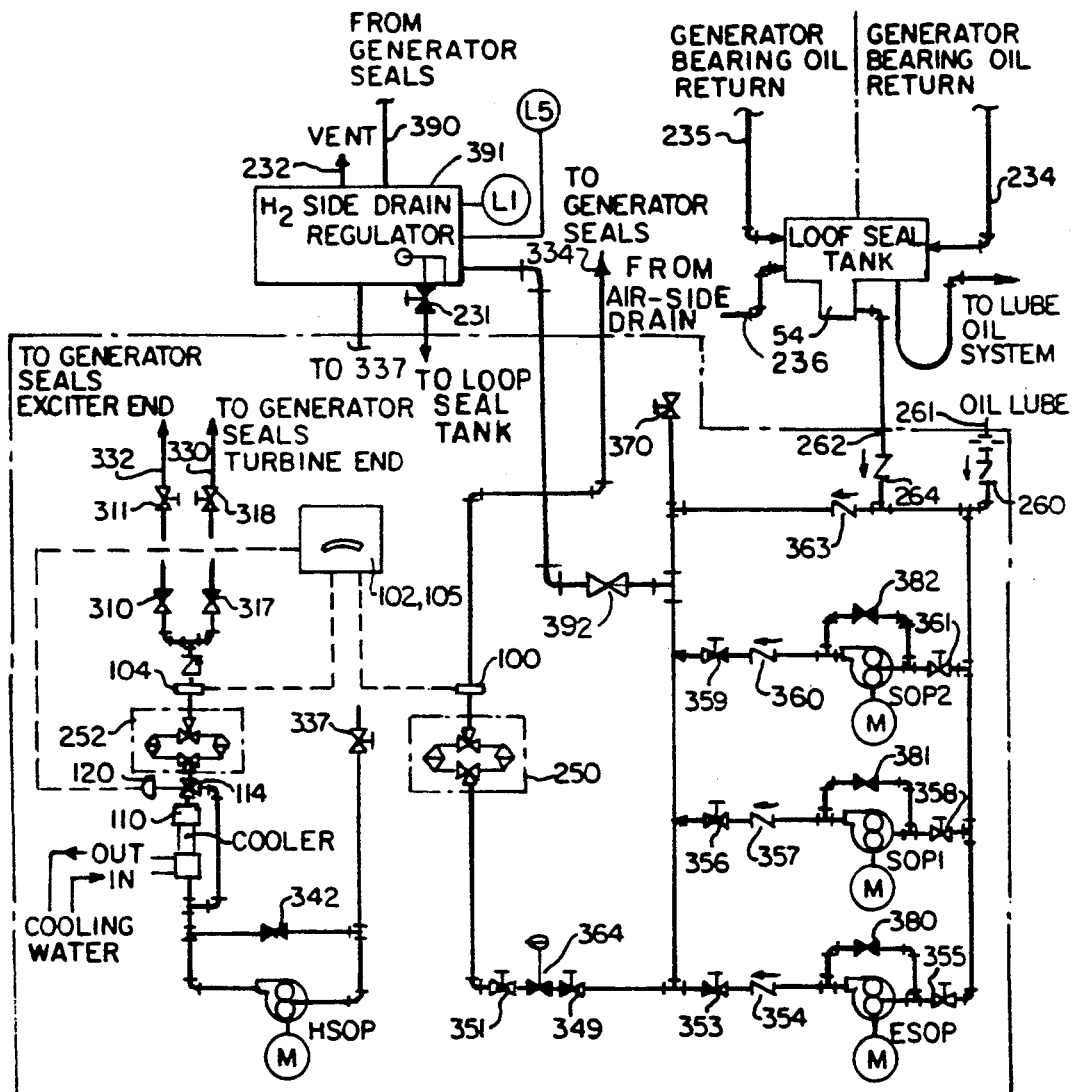
FIG. 4 shows an engineering schematic of the hydrogen- and air-side oil systems utilizing the temperature control system of FIG. 3A.

FIG. 4 illustrates the bypass arrangement of FIG. 3A in slightly greater detail. As shown in FIG. 4, the air-side pump will generally include a pair of seal oil pumps (SOP1, SOP2) driven by AC motors with an emergency seal oil pump (ESOP) driven by a DC motor. The fluid is pressurized on the hydrogen-side by an AC motor driven oil pump (HSOP). Thus, as shown in FIG. 4, the temperature of oil passing from filters 250,252 then is sensed by temperature sensors 100,104 to produce a signal to the control unit 102,105 which will include circuitry for differentiating the temperature signals and producing a valve control signal based upon the difference between the temperature signals. The controller 102,105 will thus produce a signal to a valve controller 120 which controls the mixing of cooled and uncooled oil by three-way valve 114. Appropriate valving is provided to maintain the air- and hydrogen-side seal oils at the same pressure, and at a pressure which is approximately 12 psi above the hydrogen gas pressure in the generator.

An important aspect of the present invention, as shown in FIG. 4, resides in the use of the lube oil as the main feed source into the air-side system as shown at 260. Since a separate precise control of the air-side oil is not necessary, oil cooled from the main lubrication system can be utilized without the need for a separate cooler. The loop seal tank is connected to the air-side oil tank as shown at 262, but only for use as a back up oil supply. In particular, the oil from the loop seal tank is supplied at a lower pressure than the lube oil such that the loop seal oil generally does not enter the system unless the lube oil pressure fails. Check valves 262,266 are provided for preventing backflow of the oil. Thus, in accordance with the present invention, the lube oil is fed directly to the air-side oil system, with the hot loop seal oil utilized as a back-up or emergency flow. In contrast, in the prior art system, hot oil is fed to supply the air-side oil system from the loop seal tank, with the oil cooled by a separately controlled cooler in the air-side system. In the prior art systems, the back-up system utilized lube oil fed directly to the gland seals (i.e. at 42,40—FIG. 2), thus requiring additional hardware for providing an appropriately pressurized flow to the gland seal as an emergency back-up.

Still referring to FIG. 4, suitable isolation valves 349,353,355,358,361,353,356, and 359 are provided to isolate various portions of the pump systems to allow for maintenance or repairs. Check valves are provided at 354,357,360 and 363 to prevent backflows. Bypass relief valves 342,380, 381 and 382 are provided to feed any excess pumping fluid pressure back to the suction side of the pumps. A pressure regulator 364 controls the pressure of the air-side oil fed to the generator seal. Pressure equalizing valves 310,317 ensure that the oils fed to the gland seals are at the same pressure. A valve 370 is provided for connecting the air-side to a turbine control system which will detect the oil pressure, and shut off the turbine generator where oil pressure is insufficient. The hydrogen-side oil is thus fed to the gland seals as indicated at 330,332 and the air-side oil is fed to the gland seals as shown at 334. Note that the air side feed 334 is split (not shown) to feed a pair of gland seals, one on each side of the generator.

Oil draining from the hydrogen-side of the seals is drained as shown at 390, to a regulator tank 391. Oil from the generator bearings is collected by the loop seal tank as indicated at 234,235, with oil from the regulator tank (231) and the air-side drain collected as shown at 236. Alternatively, if desired, the tank drain could be fed to the air-side system rather than the loop seal tank. A level indicator LI provides a meter indication to an operator, and a level sensor LS sounds an alarm and/or causes actuation of a drain valve 231 when the tank level is too high. A solenoid 392 can be provided to admit oil from the air-side system when the level sensor indicates the level in the regulator tank is low. A vent 232 is also provided to prevent build-up of excess gas pressure in the regulator tank. Oil from the regulator tank is then fed back to the hydrogen side pump through shut off or isolation valve 337, which connection is shown as broken for clarity in the figure.

INDUSTRIAL APPLICABILITY

The present invention provides improved temperature control such that the temperature difference between the air-side and hydrogen-side seal oils can be consistently minimized. In addition, the need for constant manual control or separate precise and accurate temperature controllers is eliminated. Thus, seal oils having the same or nearly the same temperatures can be provided to a gland seal which advantageously prevents damage to the generator shaft and associated gland seal which can be caused by thermal differential expansion of the shaft, while also reducing costs associated with operator supervision or capital outlay of independent control systems.

What is claimed is:

1. A system for supplying seal oils to a gland seal wherein said gland seal receives at least two sources of oil and directs the oils toward and along a shaft to form a seal, the system comprising:
   first oil feeding means for providing a first supply of oil to a gland seal;
   second oil feeding means for providing a second supply of oil to said gland seal;
   reference temperature means for providing a reference temperature signal indicative of the temperature of the second supply of oil fed to said gland seal; and
   temperature control means for controlling the temperature of said first supply of oil fed to said gland seal in response to said reference temperature signal.

2. The oil supply system of claim 1, wherein said reference temperature means includes a reference temperature sensor positioned in said second oil feeding means upstream of said gland seal, said temperature sensor producing a reference temperature signal indicative of the temperature of said second supply of oil fed to said gland seal.

3. The oil supply system of claim 2, wherein said temperature control means includes a second temperature sensor positioned in said first oil feeding means, said second temperature sensor producing a second temperature signal indicative of the temperature of said first supply of oil fed to said gland seal.

4. The oil supply system of claim 3, wherein said temperature control means includes a differentiator for comparing said reference temperature signal and said second temperature signal and for producing a difference signal indicative of the temperature difference between said first and second oil supplies fed to said gland seal.

5. The oil supply system of claim 4, said temperature control means further including cooling means for cooling said first supply of oil upstream of said second temperature sensor, said temperature control means further including adjusting means for adjusting the amount of cooling imparted to said first supply of oil by said cooling means in response to said difference signal.

6. The oil supply system of claim 5, wherein said cooling means includes a cooler having water inlet and outlet passages for feeding water into and out of said cooler for cooling said first supply of oil, said adjusting means including means for controlling operation of a valve to control the flow rate of water through said cooler in response to said difference signal.

7. The oil supply system of claim 5, wherein said cooling means includes a cooler through which at least a portion of said first supply of oil passes for cooling said first supply, said first oil feeding means including an oil passage feeding oil to said cooler and a bypass passage for feeding uncooled oil past said cooler toward said gland seal, said adjusting means including means for mixing cooled oil from said cooler and uncooled oil from said bypass passage and for varying the proportions of said cooled and uncooled oil in response to said difference signal.

8. The oil supply system of claim 1, wherein first oil feeding means feeds oil to a hydrogen-side of said gland seal for preventing escape of hydrogen from a generator interior and said second oil feeding means feeds oil to an air-side of said gland seal for preventing access of air and moisture to the generator interior.

9. The oil supply system of claim 1, wherein said first oil feeding means includes a regulator tank for regulating the amount of oil in said first oil feeding means, said regulator tank including an inlet for receiving oil from said second oil feeding means to increase the amount of oil in said tank, and an outlet for draining oil from said regulator tank to reduce the amount of oil in said regulator tank.

10. The oil supply system of claim 1, wherein said second oil feeding means is connected to the main lubrication oil system of a turbine generator such that the lubrication system provides the primary source of oil to said second oil feeding means.

11. The oil supply system of claim 10, wherein said second oil feeding means is connected to a loop seal tank for receiving oil from said loop seal tank as a back-up to the primary source of oil from the lubrication system.

12. An oil supply system for providing first and second supplies of oil to a gland seal of a generator, wherein the first supply of oil travels through said gland seal forward and along a generator shaft to prevent escape of a gas from the interior of the generator and the second supply of oil travels through said gland seal toward and along the generator shaft to prevent air and moisture from entering the generator, the system comprising:
first oil feeding means for providing a first supply of oil to a gland seal;
cooling means for cooling said first supply of oil;
second oil feeding means for providing a second supply of oil to the gland seal;
inlet means for connecting said second oil feeding means to a main lubrication system of a turbine generator such that the main lubrication system provides the primary source of oil to the second oil feeding means; and
temperature control means for controlling the temperature of the first supply of oil fed to the gland seal, said temperature control means including a cooler, a reference temperature sensor for providing a reference temperature signal indicative of the temperature of said second supply of oil fed to the gland seal, a second temperature sensor for providing a second temperature signal indicative of the temperature of the first supply of oil fed to the gland seal, said temperature control means including a differentiator for receiving said reference signal and said second signal and for producing a difference signal indicative of the difference in temperature between said first and second supplies, said control means further including adjusting means for adjusting the amount of cooling imparted to said first supply of oil fed to said gland seal by said cooling means in response to said difference signal.

13. The oil supply system of claim 12, wherein said second oil feeding means further includes means connecting said second oil feeding means to a loop seal tank such that said loop seal tank provides a secondary source of oil to said second oil feeding means as a back-up to the primary source provided by the connection to the main lubrication system.

14. The oil supply system of claim 13, wherein the first oil feeding means includes a regulator tank for regulating the amount of oil within the first oil feeding means, said regulator tank including a tank inlet for receiving oil from said second oil feeding means to increase the amount of oil in said regulator tank, and a tank drain for draining oil from said tank to decrease the amount of oil in said tank.

15. The oil supply system of claim 12, wherein first oil feeding means includes a passage feeding oil to said cooler and a bypass passage for feeding uncooled oil past said cooler to be mixed with oil cooled by said cooler, said adjusting means varying the proportions of cooled and uncooled oil fed to the gland seal.

16. The oil supply system of claim 12, wherein said adjusting means varies the flow rate of a cooling medium through said cooler.

17. A method for supplying oil to a gland seal of a generator to prevent escape of a gas from the interior of the generator and to prevent air and moisture from entering the interior of the generator, the method comprising:
providing a first supply of oil to said gland seal;
providing a second supply of oil to said gland seal;
connecting said second supply of oil to the main lubrication system of a turbine generator such that the main lubrication system provides the primary source of oil to the second supply;
sensing the temperature of the second supply of oil; and
cooling the first supply of oil by means of mixing cooled and uncooled oil such that the temperature of the first supply of oil fed to the gland seal substantially corresponds to the temperature of the second supply of oil.

18. The method of claim 17, further including connecting the second supply of oil to a loop seal tank such that the loop seal tank provides a secondary source of oil to the second supply as a back-up to the primary source provided by the main lubrication system.

19. A method for supplying oil to a gland seal of a generator to prevent escape of a gas from the interior of the generator and to prevent air and moisture from entering the interior of the generator, the method comprising:

providing a first supply of oil to said gland seal;
providing a second supply of oil to said gland seal;
connecting said second supply of oil to the main lubrication system of a turbine generator such that the main lubrication system provides the primary source of oil to the second supply;
sensing the temperature of the second supply of oil; and
cooling the first supply of oil by means of varying the flow rate of a cooling medium through a cooler which cools the first supply such that the temperature of the first supply of oil fed to the gland seal substantially corresponds to the temperature of the second supply of oil.

20. The method of claim 19, further including connecting the second supply of oil to a loop seal tank such that the loop seal tank provides a secondary source of oil to the second supply as a back-up to the primary source provided by the main lubrication system.

* * * * *